US009237204B1

(12) United States Patent
Martini et al.

(10) Patent No.: US 9,237,204 B1
(45) Date of Patent: Jan. 12, 2016

(54) WEB REDIRECTION FOR CACHING

(71) Applicant: iboss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/497,167

(22) Filed: Sep. 25, 2014

Related U.S. Application Data

(60) Provisional application No. 62/031,080, filed on Jul. 30, 2014.

(51) Int. Cl.
*G06F 15/16* (2006.01)
*H04L 29/08* (2006.01)

(52) U.S. Cl.
CPC ............ *H04L 67/2842* (2013.01); *H04L 67/02* (2013.01)

(58) Field of Classification Search
CPC . H04L 67/20; H04L 67/2823; H04L 67/2842; H04L 67/18
USPC .......................................................... 709/217
See application file for complete search history.

(56) References Cited

U.S. PATENT DOCUMENTS

| | | | | |
|---|---|---|---|---|
| 6,438,125 | B1 * | 8/2002 | Brothers | 370/352 |
| 6,654,807 | B2 | 11/2003 | Farber et al. | |
| 7,349,979 | B1 * | 3/2008 | Cieslak et al. | 709/238 |
| 7,925,835 | B2 * | 4/2011 | Elazary et al. | 711/133 |
| 8,626,876 | B1 * | 1/2014 | Kokal et al. | 709/219 |
| 2002/0112121 | A1 | 8/2002 | Gerszberg et al. | |
| 2003/0023729 | A1 * | 1/2003 | Foster | 709/226 |
| 2003/0041094 | A1 * | 2/2003 | Lara et al. | 709/201 |
| 2008/0320225 | A1 * | 12/2008 | Panzer et al. | 711/130 |
| 2010/0031160 | A1 * | 2/2010 | Boyer et al. | 715/744 |
| 2010/0088335 | A1 | 4/2010 | Mimatsu | |
| 2011/0258526 | A1 * | 10/2011 | Supakkul et al. | 715/230 |
| 2011/0295936 | A1 * | 12/2011 | Gill et al. | 709/203 |
| 2011/0307622 | A1 | 12/2011 | Williams | |
| 2012/0011567 | A1 * | 1/2012 | Cronk et al. | 726/4 |
| 2012/0096106 | A1 * | 4/2012 | Blumofe et al. | 709/213 |
| 2012/0117239 | A1 | 5/2012 | Holloway et al. | |

(Continued)

OTHER PUBLICATIONS

Configuring Web Cache Services Using WCCP, http://www.cisco.com/c/en/us/td/docs/ios/12_2/configgun/configuration/guide/ffun_c/fcf018.html, Jun. 2, 2014, 7 pages.
Configuring WCCP, Cisco Systems, Inc., Nov. 16, 2011, 34 pages.
Redirect caching deep dive, http://www.stevesouders.com/blog/2010/07/23/redirect-caching-deep-dive/, Jul. 23, 2010, 2 pages.

(Continued)

*Primary Examiner* — Tauqir Hussain
(74) *Attorney, Agent, or Firm* — Fish & Richardson P.C.

(57) ABSTRACT

This specification generally relates to using redirect messages to implement caching. One example method includes receiving from a client a first request for a network resource, the first request including an original location of the network resource; determining that a response to the first request is to be cached; sending a redirect response to the client including a cache location for the network resource; receiving a second request for the network resource from the client, the second request including the cache location; in response to receiving the second request for the network resource from the client: determining that the network resource has not been previously cached; retrieving the network resource from the original location; caching the retrieved network resource in a location associated with the cache location for the network resource; and sending the retrieved network resource to the client.

16 Claims, 5 Drawing Sheets

(56) References Cited

U.S. PATENT DOCUMENTS

| | | | | |
|---|---|---|---|---|
| 2012/0203861 | A1* | 8/2012 | Flack et al. | 709/217 |
| 2012/0239537 | A1* | 9/2012 | Baker et al. | 705/27.1 |
| 2012/0239785 | A1* | 9/2012 | Pazos | 709/219 |
| 2013/0191814 | A1* | 7/2013 | Fujii et al. | 717/124 |
| 2014/0007239 | A1 | 1/2014 | Sharpe et al. | |

OTHER PUBLICATIONS

Young, International Search Report, International Application No. PCT/US15/42980 dated Oct. 30, 2015, 11 pages.

Young, International Search Report, International Application No. PCT/US15/42974 dated Oct. 29, 2015, 11 pages.

* cited by examiner

WEB REDIRECTION FOR CACHING

CROSS REFERENCE TO RELATED APPLICATIONS

This application claims the benefit of U.S. Provisional Patent Application No. 62/031,080, filed Jul. 30, 2014, which is hereby incorporated by reference.

BACKGROUND

This specification generally relates to using client redirection to implement caching.

The Internet is a global network of computers that provide information, such as web pages, to clients in response to requests. In some cases, this provided information may be cached in a location that can be accessed more quickly by clients than the computer that provided the information, such as a cache server. Subsequent requests for the same information may be fulfilled by the cache server rather than the remote computer, which may lead to the information being returned to the client faster.

SUMMARY

In general, one aspect of the subject matter described in this specification may be embodied in systems, and methods performed by data processing apparatuses that include the actions of receiving from a client a first request for a network resource, the first request including an original location of the network resource; determining that a response to the first request is to be cached; in response to determining that the response to the first request is to be cached, sending a redirect response to the client including a cache location for the network resource; receiving a second request for the network resource from the client, the second request including the cache location; in response to receiving the second request for the network resource from the client: determining that the network resource has not been previously cached; retrieving the network resource from the original location; caching the retrieved network resource in a location associated with the cache location for the network resource; and sending the retrieved network resource to the client.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
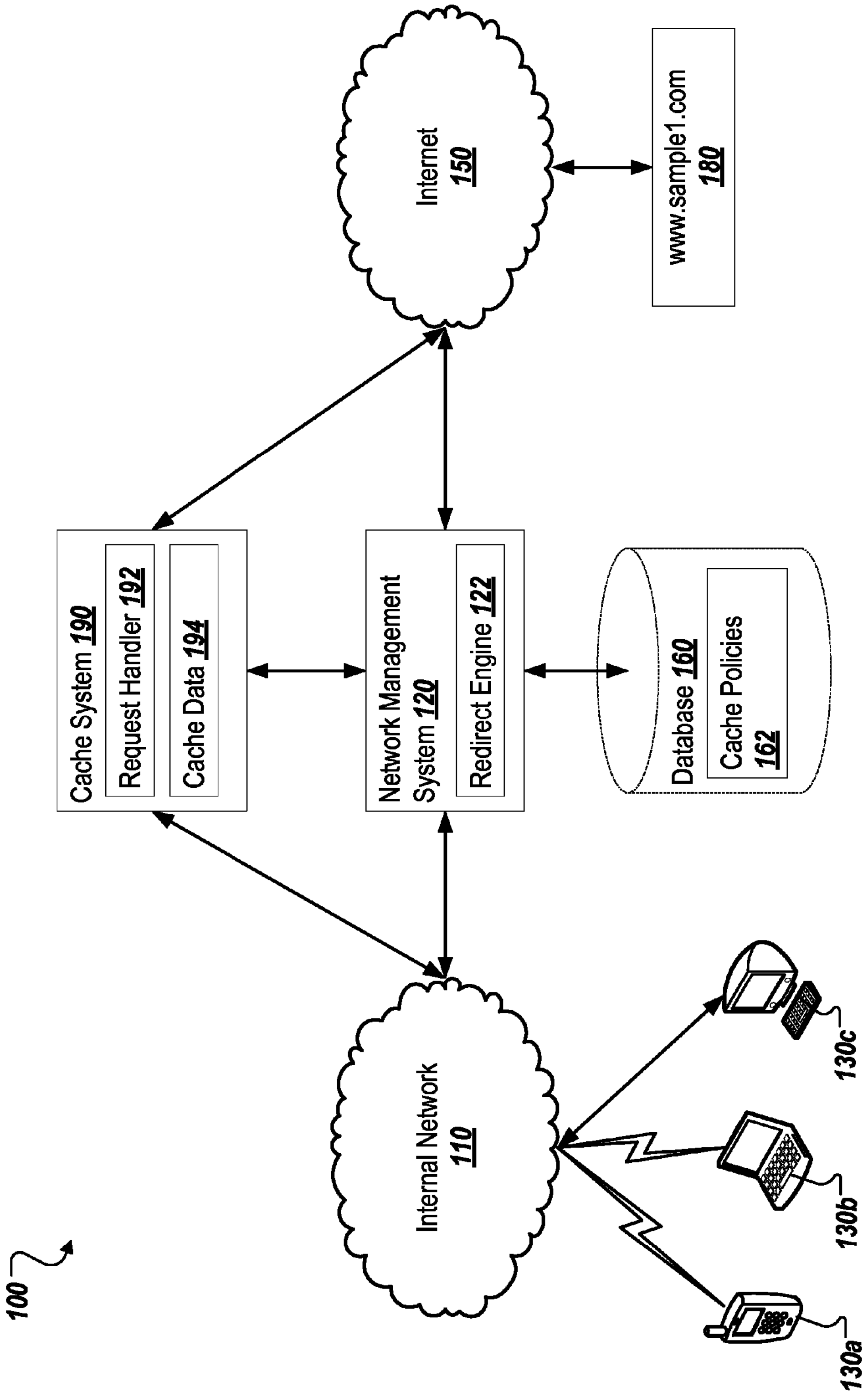
FIG. 1 is a diagram of an example environment.

The present disclosure generally relates to techniques for using redirection of client requests to perform caching of requested content. As previously described, caching may be used in a network to increase the speed at which requested network resources are delivered to clients. For example, a network owner may store content to be cached on a dedicated caching network with several geographically diverse servers. In such a case, the caching network may receive requests from clients and attempt to deliver requested content from the server that is geographically nearest to the requesting client. Other techniques use proprietary protocols to communicate client requests to cache servers, which then provide the requested content.

Many network protocols, such as Hypertext Transfer Protocol (HTTP), include redirection mechanisms allowing a server to instruct a client to fetch requested content from an alternate location, such as a different server identified by a different Uniform Resource Locator (URL). The present techniques selectively utilize these redirection mechanisms to direct client requests to a cache system. If the cache system has the requested content stored, it may return the stored version of the requested content to the client. If the cache system does not have the requested content stored, it may retrieve the requested content on behalf of the client and returns it. The cache system may then store the requested content and return the stored version of the requested content in response to future requests.

One example method according to the present disclosure includes receiving a request for a network resource from a client including an original location of the network resource, such as a URL. A determination is made that a response to the first request is to be cached, such as, for example, based on the type of network resource requested, the original location of the network resource, or other factors. If the response is to be cached, a redirect response is sent to client including a cache location for the network resource, such as, for example, a URL associated with a cache server. A second request for the network resource is then received from the client including the cache location. In some cases, the second request may be received by a cache server. A determination is then made whether the network resource has been previously cached. If so, a cached version of the network resource is returned to the client in response to the second request. If not, the network resource is retrieved from the original location, stored as a cached version of the network resource, and sent to the client in response to the second request.

The techniques described herein may provide several advantages. By using widely supported and well-known redirection mechanisms of standard protocols rather than custom protocols, the techniques described herein may be more widely applicable than previous techniques. The techniques also may allow for more flexible and configurable implementations of caching by allowing the decision to redirect to be made by a network management system rather than based on local rules stored at the client.

FIG. 1 is a diagram of an example environment 100. As shown, the example environment includes one or more devices 130*a-c* connected to an internal network 110. A network management system 120 and a cache system 190 are also connected to the internal network 110. Network management system 120 is connected to a database 160. The cache system 190 and the network management system 120 connected to the Internet 150. A website 180 is connected to the Internet 150. In operation, one of the devices 130*a-c* may send a request to the website 180 via the internal network 110. For example, a device may send an HTTP GET request including the URL of a resource hosted by the website 180 (e.g., "www.sample1.com/hello.gif"). Network management system 120 may intercept the request, and determine that the request is configured to be cached. The network management system 120 may send a redirect message to the requesting device directing the device to the cache system 190. For example, the network management system 120 may send an HTTP response indicating that a redirect should occur including a new URL for the device to request. The new URL may identify the cache system 190, and may include an indication of the original URL that was requested. For example, the new URL may be of the form "www.cache.com/orig?www.sample1.com/hello.gif." The requesting device may then send another request for the website 180 through the cache system 190. The cache system 190 may determine that it has a stored copy of the response to the request, and may return the stored copy to the requesting device. The cache system 190 may also determine that it does not have a stored copy of the response to the request, and may forward the request to the website 180 via the Internet 150. The website 180 may respond to the request with a response, such as, for example, a webpage or other resource specified in the request. The cache system 190 may receive this response from the website 180, and store the response so that it may respond to future requests with the stored copy. The cache system 190 may then return the response to the requesting device over the internal network 110.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

Environment 100 also includes one or more devices 130 *a-c*. In some implementations, the one or more devices 130*a-c* include mobile devices, such as cellular telephones (e.g., 130*a*), smartphones, tablets, laptops (e.g., 130*b*) and other similar computing devices. The one or more devices 130*a-c* may also include wired devices such as desktop computer 130*c*. The one or more devices 130*a-c* may also include servers. In some implementations, the one or more devices 130*a-c* include personal devices associated with one or more users. The one or more devices 130*a-c* may also include devices issued or owned by the entity that provides the internal network 110, such as company-issued smartphones or laptops. In some implementations, the one or more devices 130*a-c* may include network access or web browsing software (e.g., a web browser) for accessing resources on the Internet 150.

In some implementations, the devices 130*a-c* may include networking software configured to request websites from the Internet 150. For example, the devices 130*a-c* may include web browser software allowing a user to browse websites on the Internet 150. The web browser software may send requests for various resources from the websites, including, but not limited to, webpages, images, videos, software programs, files, and other types of resources. In some cases, the devices 130*a-c* may send requests and receive responses using the HTTP protocol. The devices 130*a-c* may also send request and receive responses according to other network protocols, including, but not limited to, File Transfer Protocol (FTP), Simple Object Access Protocol (SOAP), Remote Procedure Call (RPC), or other protocols.

In some cases, the devices 130*a-c* may be configured to access the Internet 150 through the network management system 120, such as, for example, by the network management system 120 be configured as the default gateway to access the Internet 150. Clients 130*a-c* may also be configured to access the network management system 120 as a proxy server. In some implementations, the devices 130*a-c* may access the Internet 150 through a separate gateway (not shown), and the network management system 120 may passively monitor the requests and responses.

The environment 100 includes a network management system 120. In some implementations, the network management system may be a server or set of servers connected to the internal network 110. The network management system may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that certain traffic passes through the network management system 120, and other traffic does not pass through the network management system 120. In some implementations, the DNS functionality and the monitoring functionality of the network management system 120 may be implemented on separate servers in communication and coordination with one another.

The network management system 120 includes a redirect engine 122. In operation, the redirect engine 122 identifies requests from the devices 130*a-c* for resources on the Internet 150. The redirect engine 122 may determine that a particular request is configured to be cached, such as by consulting cache policies 162 stored in the database 160. The redirect engine 122, in response to determining that a request is configured to be cached, may send a redirect response to the requesting device instructing the device to resend its request to the cache system 190.

For example, the device 130*a* may send an HTTP GET request over the internal network 110 directed to the website 180. The HTTP GET request may include the URL "www.sample1.com/hello.gif," indicating that the request is for an image named "hello.gif" from the website 180. The network management system 120 may receive HTTP GET request from the internal network 110. The redirect engine 122 may parse the HTTP GET request, and determine that the request should be redirected to the cache system 190. In some cases, the determination may be made based on the cache policies 162, which are described in greater detail below. In response to determining that the request should be redirected, the redirect engine 122 generates an HTTP redirect response including a URL associated with the cache system 190 (e.g., "cache.com"). In some cases, the URL may also include the URL from the original HTTP GET request (e.g., "http://cache.com/r?url=www.sample1.com/hello.gif"). This may allow the cache system 190 to determine what resource the device 130a is requesting.

In some implementations, the HTTP redirect response generated by the redirect engine 122 may be a "307 temporary redirect" response including the URL, which may be formatted as follows:
HTTP/1.1 307 temporary redirect
Refresh:0;url=http://cache.com/r?url=www.sample1.com/hello.gif The first line of the response includes a version indicator ("HTTP/1.1") and a response code ("307 temporary redirect"). The second line of the response includes a refresh header indicating that the device should request the URL "http://cache.com/r?url=www.sample1.com/hello.gif after a delay of zero seconds. In some cases, HTTP redirect response generated by the redirect engine 122 may be a "200 OK" response including a refresh header.

In some cases, the redirect engine 122 may return a Hypertext Markup Language (HTML) document including an HTML meta-tag redirecting the browser to a new URL, as shown in the following example:
<html>
<head>
<meta http-equiv="Refresh" content="0; url=http://cache.com/r?url=www.sample1.com/hello.gif"/>
</head>
<body>
<p>Please follow <a href="http://cache.com/r?url=www.sample1.com/hello.gif">this link</a>.</p>
</body>
</html>

The tag "<meta http-equiv="Refresh">" instructs a browser rendering the HTML to immediately request the specified URL. In some implementations, the redirect engine 122 may use additional techniques to cause the device 130a to request a different URL, including, but not limited to, a "302 found" response, a "301 moved permanently" response, a "303 see other" response, other HTTP responses including a refresh header, or other techniques.

The environment 100 also includes a database 160. In some implementations, the database 160 may be stored on the same server as the network monitoring system 120. The database 160 may also be stored on a separate server and accessed by the network monitoring system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network monitoring system 120.

The database 160 includes cache policies 162 indicating to the network management system 120 which requests should be redirected to the cache system 190. The cache policies 162 may specify particular network addresses, domain names, request types, requested resource types (e.g., file types by extension), or other criteria indicating requests that should be redirected to the cache system 190. For example, a cache policy 162 may specify that all requests for Graphics Interchange Format (GIF) files from URLs including "www.example.com" should be redirected to the cache system 190. In some cases, the cache policies 162 may specify specific criteria identifying requests to be redirected. The cache policies 162 may also include wildcards, patterns, ranges or other criteria for defining general classes of requests to be redirected. For example, a cache policy 162 may indicate that any request to a URL matching the pattern "*.example.*" should be redirected, or may indicate that requests for resources with names that match the pattern "*.mov" should be redirected.

Environment 100 includes the cache system 190. In operation, the cache system 190 may receive requests from the devices 130a-c set in response to the redirect from a network management system 120. The cache system 190 may handle these requests differently based on the type of application that is configured. For example the cache system 190 may determine whether a resource specified in the request is stored in the cache data 194. If the resource is not stored, the cache system 190 may retrieve the resource from the Internet 150, store it in the cache data 194, and return the resource to the requesting device. If the request is stored, the cache system 190 may return the stored copy to the requesting device without accessing the Internet 150.

In some cases, the cache system 190 may include one or more storage devices for storing the requested content (not shown). These storage devices may include, but are not limited to, databases, file systems, memory devices, hard drives, cloud storage systems, or other devices.

Figure 2:
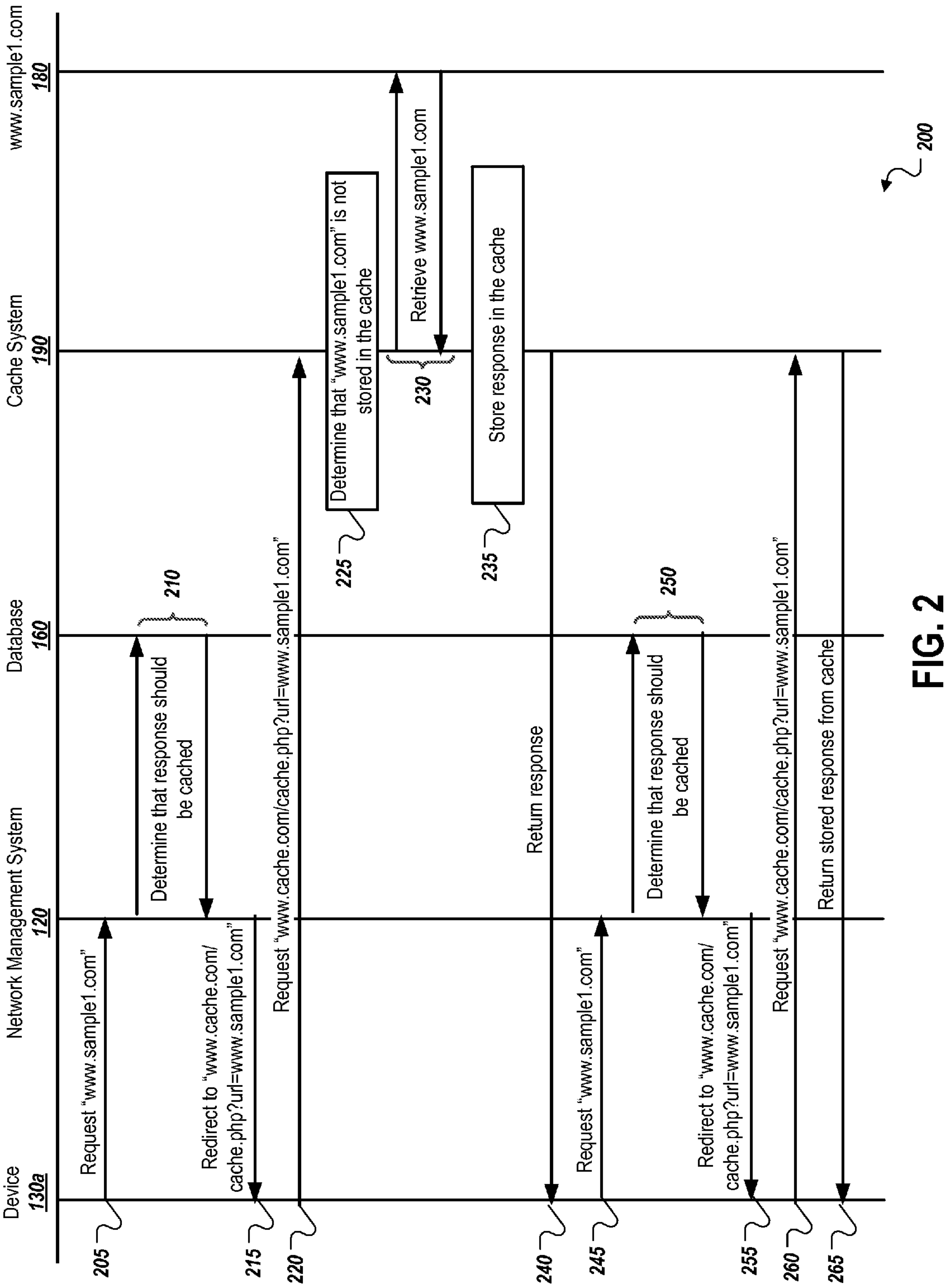
FIG. 2 is a message flow diagram of an example interaction between the components of the example environment to implement caching using redirect messages.

FIG. 2 is a message flow diagram of an example interaction 200 between the components of the example environment to implement caching using redirect messages. The 205, the device 130a sends a request for resource with the URL "www.sample1.com." In some cases, the request is an HTTP GET request. The request may also be formatted according to other network protocols, such as those described herein.

At 210, the network management system 120 interacts with the database 160 to determine that a response to the request should be cached. For example, the network management system 120 may query and examine the cache policies 162 to determine whether the request should be cached, as described previously relevant FIG. 1.

At 215, the network management system 120 redirects the device 130a to an alternate URL associated with the cache system 190. In some cases, this alternate URL may reference a resource on the cache system 190 configured to perform the caching behavior. The alternate URL may also include the original URL requested by the device 130a at 205. In some cases, the network management system 120 redirects the device 130a by sending an HTTP redirect response. The redirect response may also be formatted according to other network protocols, such as those described herein.

At 220, the device 130a sends a second request for the alternate URL to the cache system 190. In some implementations, the device 130a may perform a DNS lookup on a domain name included in the alternate URL to determine the address of the cache system 190. At 225, the cache system 190 determines that a response to the request sent at 205 is not stored by the cache system 190. At 230, the cache system 190 retrieves the requested resource from the website 180 denoted by the domain name "www.sample1.com." At 235, the cache system 190 stores the response received from the website 180. At 240, the cache system 190 returns the response received from the website 180 to device 130a.

At 245, the device 130a sends an additional request for the same resource requested at 205. At 250, the network management system 120 consults the database 160 to determine that the response to the request should be cached. At 255, the network management system 120 redirects the device 130a to the alternate URL.

At 260, the device 130*a* requests the alternate URL from the cache system 190. Because the response to the request was previously stored by the cache system 190 (at 235), the cache system 190 returns the previously stored response to device 130*a*.

Figure 3:
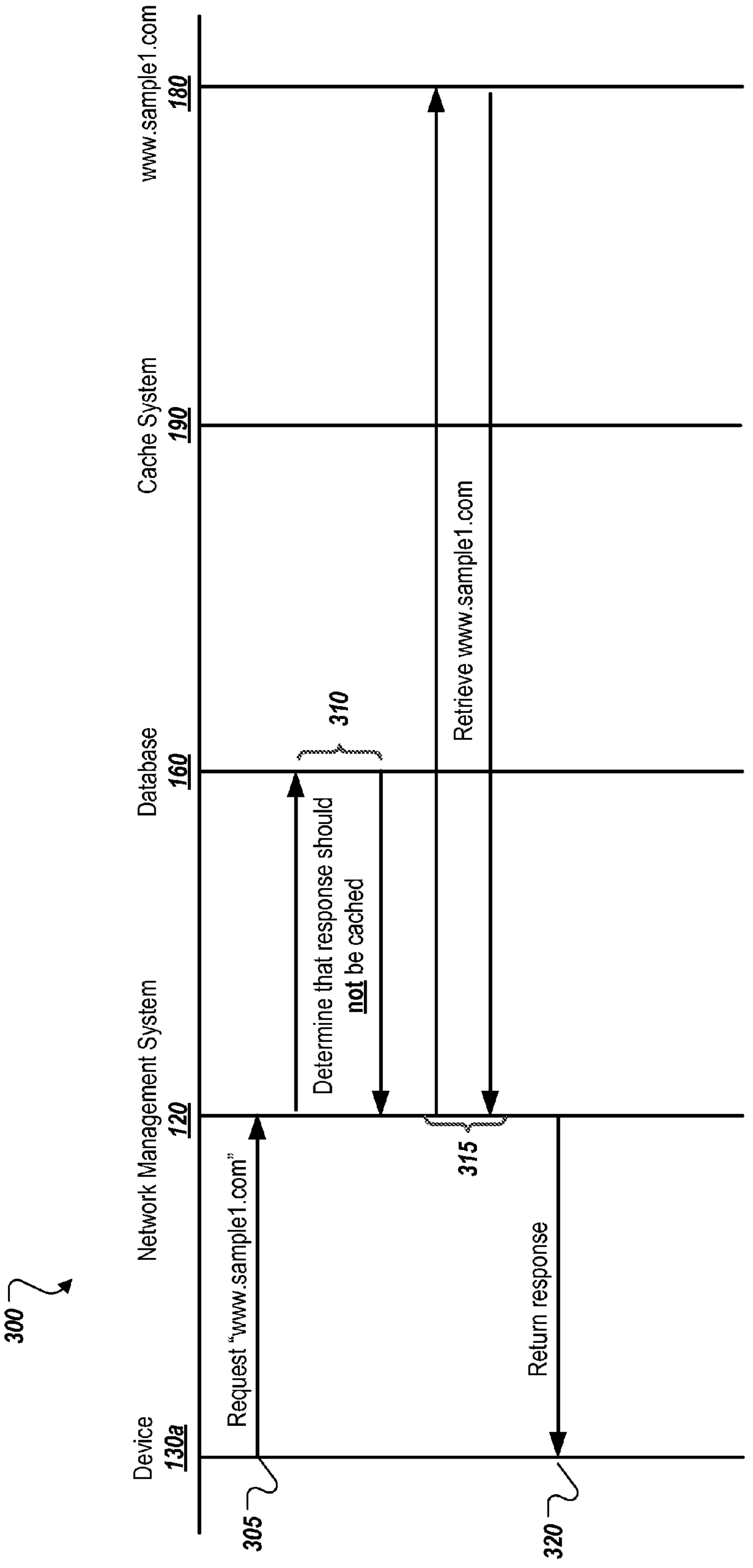
FIG. 3 is a message flow diagram of an example interaction between the components of the example environment showing a case where caching is not enabled for a particular request.

FIG. 3 is a message flow diagram of an example interaction 300 between the components of the example environment showing a case where caching is not enabled for a particular request. At 305, the device 130*a* the device 130*a* sends a request for resource with the URL "www.sample1.com." At 310, the network management system 120 consults the database 160 to determine that the response to the request should not be cached. At 315, the network management system 120 forwards the request received at 305 to the website 180 and receives a response from the website 180. At 320, the network management system 120 returns the response received from the website 180 to the device 130*a*.

Figure 4:
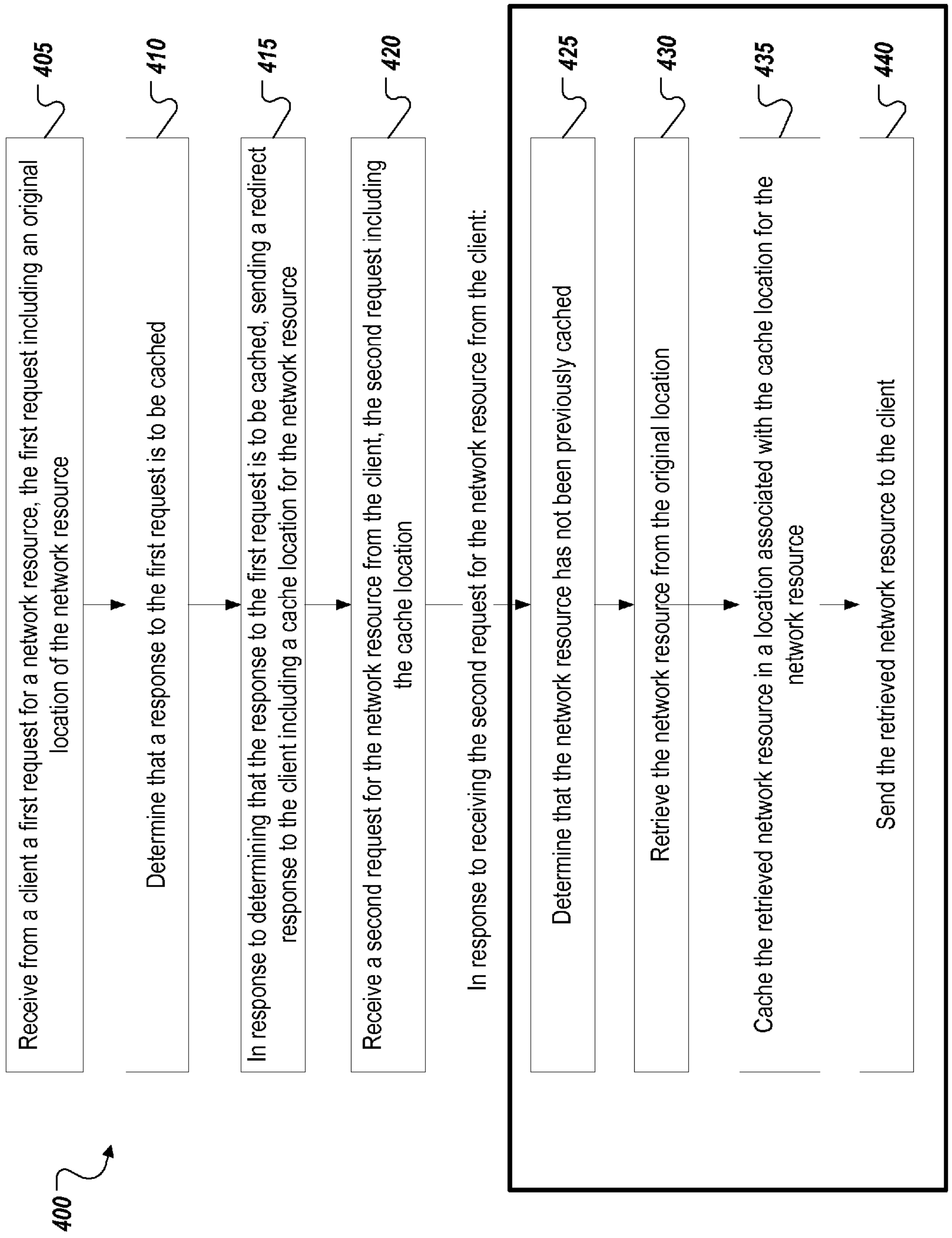
FIG. 4 is a flow chart of an example process of using redirect messages to implement caching.

FIG. 4 is a flow chart of an example process 400 of using redirect messages to implement caching. As 405, a first request for a network resource is received from a client. The first request includes an original location of the network resource. In some implementations, receiving the first request for the network resource includes receiving an Hypertext Transfer Protocol (HTTP) GET request, and the original location for the network resource includes a Uniform Resource Locator (URL) for the network resource.

At 410, a determination is made that a response to the first request is to be cached. In some cases, determining that the response to the first request is to be cached includes determining that a domain name associated with the network resource is included in a list of domain names to be cached. In some implementations, determining that the response to the first request is configured to be cached is based at least in part on a domain name included in the original location for the network resource. Determining that the response to the first request is configured to be cached may be based at least in part on a resource type associated with the network resource. In some cases, the resource type may be a video file, an archive file, an executable file, an image file, or another type of resource. The resource type may also be determined based on a file extension included in the original location. Determining that the response to the first request is configured to be cached may also be based at least in part on a category associated with the network resource.

At 415, in response to determining that the response to the first request is to be cached, a redirect response is sent to the client including a cache location for the network resource. In some cases, sending the redirect response to the client includes sending an HTTP redirect message to the client, and cache location includes a URL associated with a cache server and the URL for the network resource. At 420, a second request for the network resource is received from the client, the second request including the cache location.

Actions 425 through 440 are performed in response to receiving the second request for the network resource from the client. At 425, a determination is made that the network resource has not been previously cached. At 430, the network resource is retrieved from the original location. At 435, the retrieved network resource is cached in a location associated with the cache location for the network resource. At 440, the retrieved network resource is sent to the client.

In some cases, the client is a first client, and the process 400 includes receiving a third request for the network resource from a second client, the third request including the original location for the network resource. A redirect response may be sent to the second client including the cache location for the network resource. A fourth request for the network resource may then be received from the second client, the fourth request including the cache location. In response to receiving the fourth request for the network resource from the second client, a determination may be made that the network resource has been previously stored, and the stored network resource may be sent to the second client.

Figure 5:
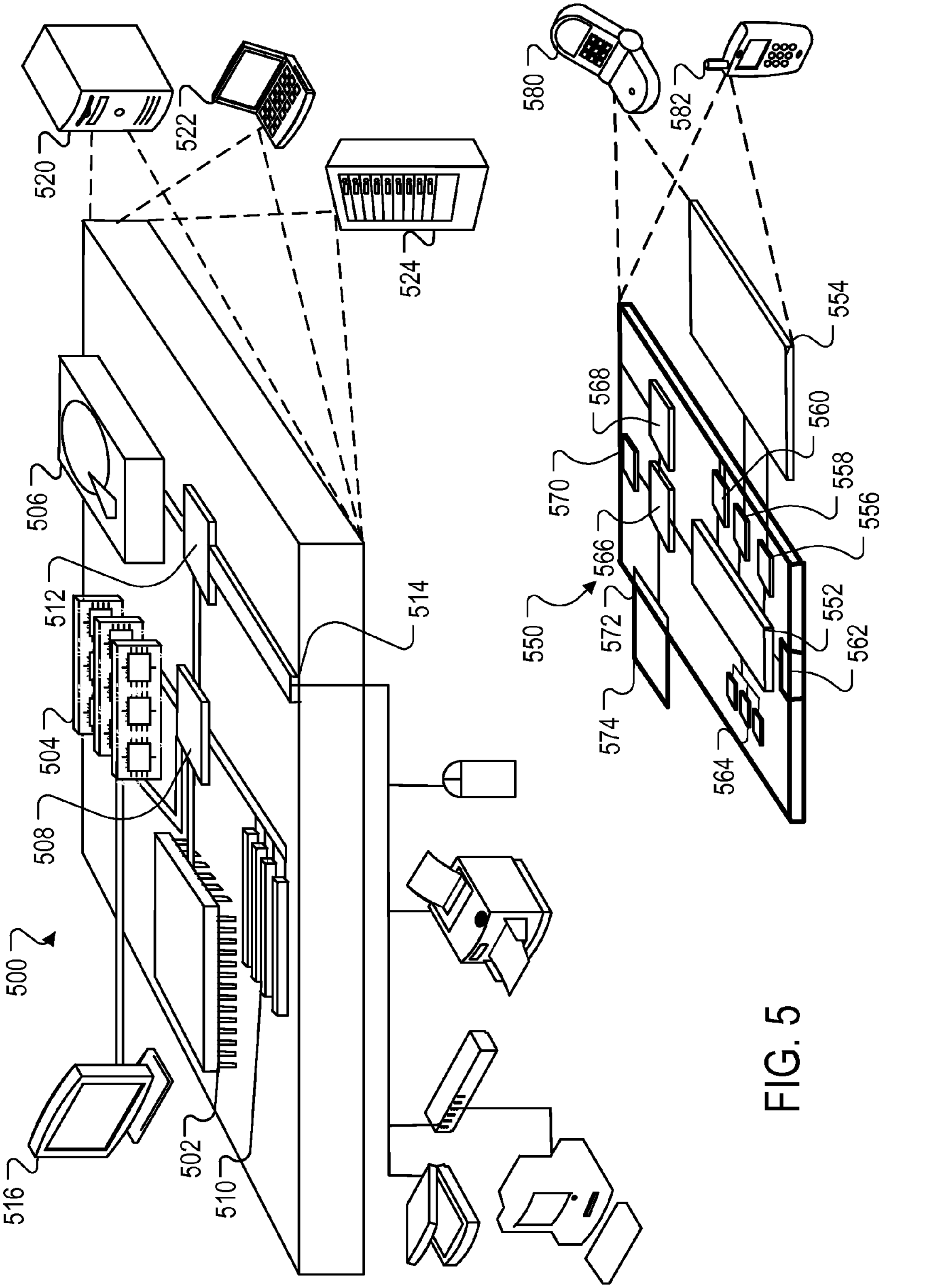
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:

receiving from a client a first request for a network resource, the first request including an original location of the network resource;

determining that a response to the first request is to be cached based at least in part on a resource type associated with the network resource, wherein the resource type associated with the network resource is determined based on a file extension included in the original location;

in response to determining that the response to the first request is to be cached, sending a redirect response to the client including a cache location for the network resource;

receiving from the client a second request for the network resource, the second request including the cache location;

in response to receiving the second request from the client for the network resource:

determining that the network resource has not been previously cached;

in response to determining that the network resource has not been previously cached:

retrieving the network resource from the original location;

caching the retrieved network resource in a storage associated with the cache location for the network resource; and sending the retrieved network resource to the client.

2. The method of claim 1, wherein receiving the first request for the network resource includes receiving an Hypertext Transfer Protocol (HTTP) GET request, and the original location for the network resource includes a Uniform Resource Locator (URL) for the network resource.

3. The method of claim 2, wherein sending the redirect response to the client includes sending an HTTP redirect message to the client, and cache location includes a URL associated with a cache server and the URL for the network resource.

4. The method of claim 1, wherein determining that the response to the first request is to be cached includes determining that a domain name associated with the network resource is included in a list of domain names to be cached.

5. The method of claim 1, wherein determining that the response to the first request is to be cached is based at least in part on a domain name included in the original location for the network resource.

6. The method of claim 1, wherein the resource type is one of a video file, an archive file, an executable file, or an image file.

7. The method of claim 1, wherein determining that the response to the first request is to be cached is based at least in part on a category associated with the network resource.

8. The method of claim 1, wherein the client is a first client, the method further comprising:

receiving a third request for the network resource from a second client, the third request including the original location for the network resource;

sending a redirect response to the second client including the cache location for the network resource;

receiving a fourth request for the network resource from the second client, the fourth request including the cache location;

in response to receiving the fourth request for the network resource from the second client:

determining that the network resource has been previously stored; and sending the stored network resource to the second client.

9. A non-transitory, computer-readable medium storing instructions operable when executed to cause at least one processor to perform operations comprising:

receiving from a client a first request for a network resource, the first request including an original location of the network resource;

determining that a response to the first request is to be cached, based at least in part on a resource type associated with the network resource, wherein the resource type associated with the network resource is determined based on a file extension included in the original location;

in response to determining that the response to the first request is to be cached, sending a redirect response to the client including a cache location for the network resource;

receiving a second request for the network resource from the client, the second request including the cache location;

in response to receiving the second request for the network resource from the client:

determining that the network resource has not been previously cached;

in response to determining that the network resource has not been previously cached:

retrieving the network resource from the original location;

caching the retrieved network resource in a storage associated with the cache location for the network resource; and sending the retrieved network resource to the client.

10. The non-transitory, computer-readable medium of claim 9, wherein receiving the first request for the network resource includes receiving an Hypertext Transfer Protocol (HTTP) GET request, and the original location for the network resource includes a Uniform Resource Locator (URL) for the network resource.

11. The non-transitory, computer-readable medium of claim 10, wherein sending the redirect response to the client includes sending an HTTP redirect message to the client, and cache location includes a URL associated with a cache server and the URL for the network resource.

12. The non-transitory, computer-readable medium of claim 9, wherein determining that the response to the first request is to be cached includes determining that a domain name associated with the network resource is included in a list of domain names to be cached.

13. The non-transitory, computer-readable medium of claim 9, wherein determining that the response to the first request is to be cached is based at least in part on a domain name included in the original location for the network resource.

14. The non-transitory, computer-readable medium of claim 9, wherein the resource type is one of a video file, an archive file, an executable file, or an image file.

15. The non-transitory, computer-readable medium of claim 9, wherein determining that the response to the first request is to be cached is based at least in part on a category associated with the network resource.

16. A system comprising:

memory for storing data; and one or more processors operable to perform operations comprising:

receiving from a client a first request for a network resource, the first request including an original location of the network resource;

determining that a response to the first request is to be cached, based at least in part on a resource type associated with the network resource, wherein the resource type associated with the network resource is determined based on a file extension included in the original location;

in response to determining that the response to the first request is to be cached, sending a redirect response to the client including a cache location for the network resource;

receiving a second request for the network resource from the client, the second request including the cache location;

in response to receiving the second request for the network resource from the client:

determining that the network resource has not been previously cached;

in response to determining that the network resource has not been previously cached:

retrieving the network resource from the original location;

caching the retrieved network resource in a storage associated with the cache location for the network resource; and sending the retrieved network resource to the client.

* * * * *